(No Model.) 2 Sheets—Sheet 1.
R. J. BARR.
DISCHARGE APPARATUS FOR COOLERS OF BONE BLACK KILNS.
No. 268,981. Patented Dec. 12, 1882.
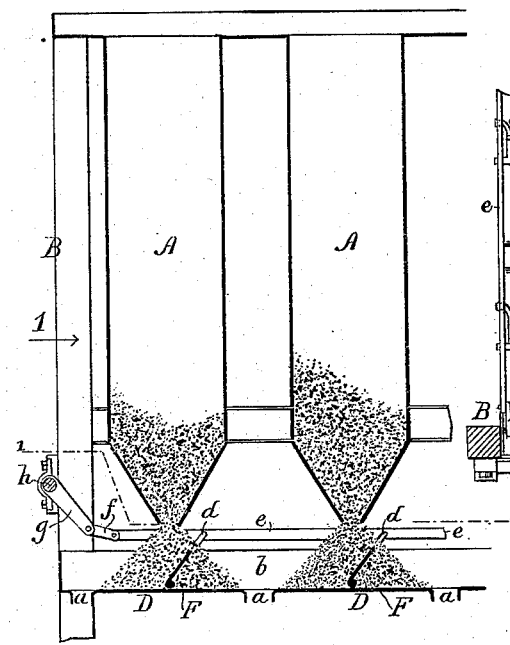
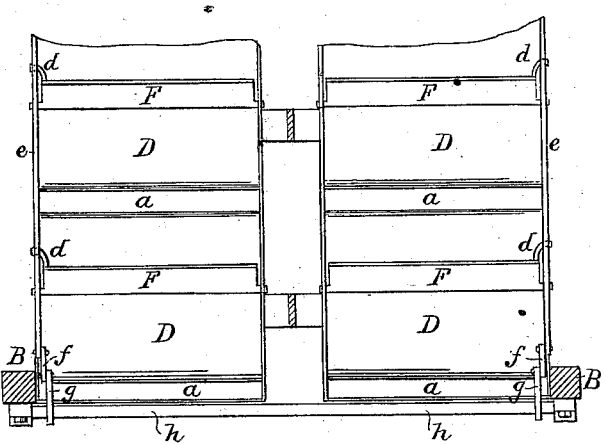
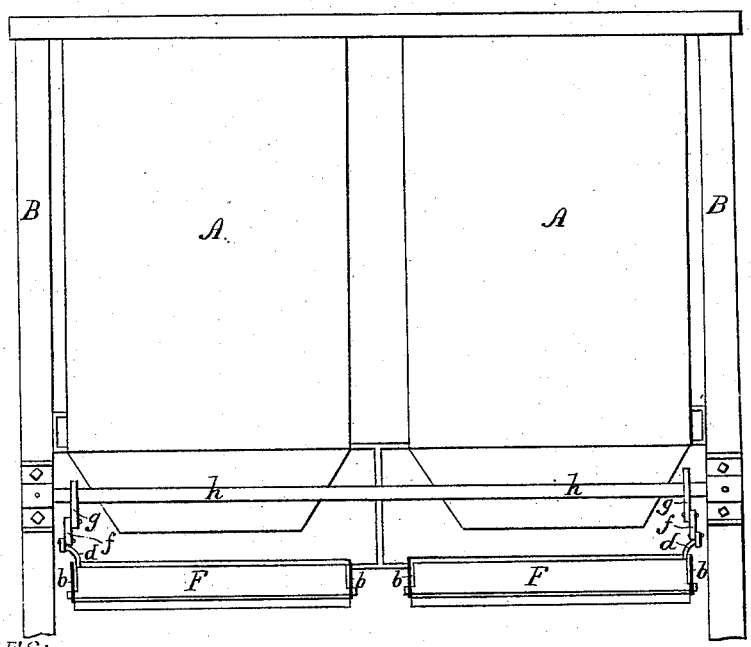
WITNESSES:
Harry Drury
Hamilton D. Turner.
INVENTOR:
Robert J. Barr
by his Attys
Howson & Sons (No Model.) 2 Sheets—Sheet 2.
R. J. BARR.
DISCHARGE APPARATUS FOR COOLERS OF BONE BLACK KILNS.
No. 268,981. Patented Dec. 12, 1882.
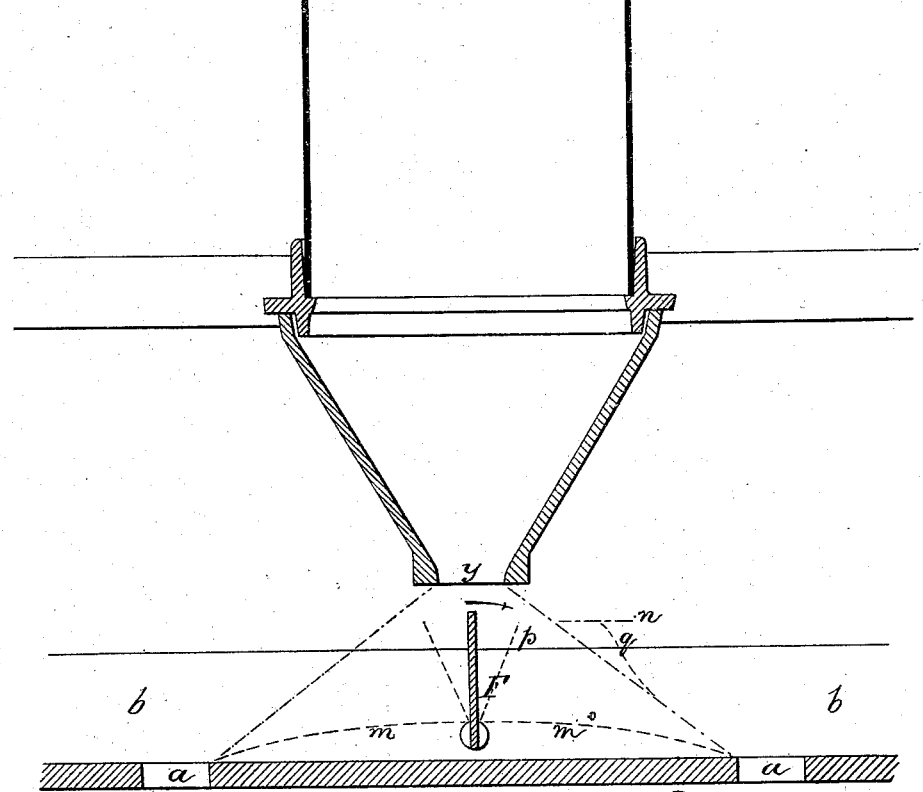

United States Patent Office.

ROBERT J. BARR, OF PHILADELPHIA, PENNSYLVANIA.

DISCHARGE APPARATUS FOR COOLERS OF BONE-BLACK KILNS.

SPECIFICATION forming part of Letters Patent No. 268,981, dated December 12, 1882.

Application filed August 7, 1882. (No model.)

*To all whom it may concern:*

Be it known that I, ROBERT J. BARR, a citizen of the United States, and a resident of Philadelphia, Pennsylvania, have invented certain Improvements in Discharge Apparatus for Coolers of Bone-Black Kilns, of which the following is a specification.

The main object of my invention is to so construct a discharging device for the coolers of bone-black kilns, &c., that the crushing or trituration of the grains of bone-black will be prevented.

In the accompanying drawings, Figure 1, Sheet 1, is a vertical section of two of a series of coolers of bone black kilns with the discharging device; Fig. 2, a sectional plan on the line 1 2, Fig. 1; Fig. 3, an end view of Fig. 1; and Fig. 4, Sheet 2, an enlarged diagram illustrating the action of the device.

A A represent two coolers, into which the charcoal from the kilns above passes by gravity.

It is the general practice to use several rows of coolers, and a number of the latter in each row; but two coolers will suffice to illustrate my invention.

Each cooler is made tapering at its lower end, so as to terminate in a contracted outlet, below which is a plate, D, between which and the plates of the adjoining coolers are openings $a$, the width of each plate between the said openings being so much larger than the width of the cooler's outlet that the granular bone-black will assume the form of a conical mass having its base spread over the plate before any of the grains can pass through the opening $a$.

Below the outlet of each cooler is a blade, F, which is pivoted at its opposite ends to longitudinal bars $b$ $b$ at the opposite edges of the plate D.

An arm, $d$, on each blade F is connected to a longitudinal rod, $e$, the latter being connected by a link, $f$, to an arm, $g$, on a rock-shaft, $h$, secured to the post B of the frame.

There is a rod, $e$, for each row of coolers, and as the rock-shaft is vibrated a reciprocating motion will be imparted to the rods and an oscillating motion to the blades F.

It should be stated here that for use in sugar-houses bone-black should be in a granular condition, and that it should be retained in this condition while it is subjected to the action of the kilns and coolers and as it is being discharged from the latter.

The manner in which the above-described device operates so as to prevent the pulverizing of the bone-black may be best explained by reference to the diagram Fig. 4. When the bone-black falls from the cooler through the outlet $y$ it accumulates on the plate D in the form of a conical mass extending from the said plate to the outlet, the inclined sides of the mass being at an angle of thirty-five degrees, or thereabout, in respect to the plate. If not agitated, the mass would remain in this condition after some of the grains had fallen through the openings $a$; and the object of my invention is to induce the bone-black to pass through these openings without subjecting the grains to such rubbing together as would have a pulverizing effect. As the blade F vibrates there will be no disturbance of the mass of bone-black from the plate D to the dotted line $m$, and this is important, for the lower portion of the mass being subjected to the greatest pressure, any disturbance of the grains would result in pulverizing them. Where the grains are subjected to less pressure, however—that is, at and below the line $n$—the greatest movement is imparted to the grains, and this outward movement is where there is the least resistance and the least forcible rubbing of the grains together. If, for instance, we suppose the blade to have been moved in the direction of the arrow to the dotted line $p$, the grains will be pushed outward laterally to the extent indicated by the dotted line $q$, and the mass thus moved outward will roll or slide down and pass through the opening $a$, a slight effort being required to thus push a portion of the mass laterally outward, because little resistance is presented, and consequently the grains of bone-black are subjected to very little trituration.

The amount of bone-black permitted to roll down the conical mass at each vibration of the blade will depend upon the extent of the vibration, such movement being imparted to the rock-shaft as the desired discharge of the bone-black may suggest.

Bone-black from a cooler has heretofore been permitted to fall and assume the form of a cone on a plate; but in order that portions of the conical mass might be discharged from the edges of the plate the mass was subjected to abrupt agitation, and the sudden jerks imparted to the entire conical mass had that triturating effect on the grains which my invention has been designed to obviate.

I claim as my invention—

1. The combination of the cooler or other vessel, A, adapted to contain bone-black or other granular material, a fixed plate, D, below the outlet of the vessel, a pivoted blade, F, and mechanism for imparting a vibrating motion to the blade, all substantially as set forth.

2. The combination of the row of coolers A, the plates D, vibrating blades F, the rod e, connected to the several blades, and mechanism for imparting a reciprocating motion to the said rod, substantially as set forth.

In testimony whereof I have signed my name to this specification in the presence of two subscribing witnesses.

ROBERT J. BARR.

Witnesses:
HARRY DRURY,
HUBERT HOWSON.